(12) United States Patent
Gurevich

(10) Patent No.: US 9,513,483 B2
(45) Date of Patent: Dec. 6, 2016

(54) BEAM SHAPER SYSTEM FOR LASER DIODE ARRAY

(71) Applicant: Igor Gurevich, Saarbrucken (DE)

(72) Inventor: Igor Gurevich, Saarbrucken (DE)

( * ) Notice: Subject to any disclaimer, the term of this patent is extended or adjusted under 35 U.S.C. 154(b) by 0 days.

(21) Appl. No.: 14/658,492

(22) Filed: Mar. 16, 2015

(65) Prior Publication Data

US 2016/0274368 A1 Sep. 22, 2016

(51) Int. Cl.
*G02B 27/10* (2006.01)
*G02B 27/30* (2006.01)
*G02B 27/09* (2006.01)

(52) U.S. Cl.
CPC .......... *G02B 27/0961* (2013.01); *G02B 27/30* (2013.01)

(58) Field of Classification Search
USPC ........ 359/619, 622, 623, 624, 626, 641, 642
See application file for complete search history.

(56) References Cited

U.S. PATENT DOCUMENTS

| | | |
|---|---|---|
| 4,609,258 A | 9/1986 | Adachi et al. |
| 5,056,881 A | 10/1991 | Bowen |
| 5,268,922 A | 12/1993 | Fouere et al. |
| 5,369,659 A | 11/1994 | Furumoto et al. |
| 5,541,774 A | 7/1996 | Blankenbecler |
| 5,636,059 A | 6/1997 | Snyder |
| 5,808,323 A | 9/1998 | Spaeth et al. |
| 5,825,551 A | 10/1998 | Clarkson |
| 6,407,870 B1 | 6/2002 | Gurevich |
| 2005/0105189 A1 | 5/2005 | Mikhailov |

*Primary Examiner* — Jack Dinh

(74) *Attorney, Agent, or Firm* — TransPacific Law Group; Pavel I. Pogodin, Esq.

(57) ABSTRACT

Proposed is a beam shaper for beams emitted from at least one laser-diode bar and consisting of a fast-axis collimator composed of a common cylindrical lens with an aspherical profile, an array of spherical/aspherical telescope units formed from a pair of microlenses, where each individual telescope unit is shifted in accordance with a predetermined law to a certain distance relative to a neighboring individual telescope unit, an array of cylindrical lenses shifted relative to each other in accordance with another predetermined law, and a system of collimation lenses that collimate the beams of the predetermined spatial pattern into a two-dimensional pattern having a less discrete and more uniform distribution of light intensity and a shape more convenient for subsequent coupling, e.g., for focusing into the end face of an optical fiber of a light transmission system.

18 Claims, 8 Drawing Sheets

BEAM SHAPER SYSTEM FOR LASER DIODE ARRAY

FIELD OF INVENTION

The present invention relates to the field of optics, in particular to a system for controlling an optical beam. More specifically, the invention concerns an optical beam shaper that provides spatial redistribution of an inhomogeneous beam. The invention may find application in laser optics, e.g., in shaping, collimating, or focusing of beams, inputting of beams emitted by laser diodes into optical fiber cables, in particular by laser diode arrays, e.g., by laser-diode bars or stacks.

BACKGROUND OF THE INVENTION

A light beam emitted practically by any powerful laser-diode source has in its cross section two mutually orthogonal directions where angular divergences of the beams in both directions are different. Conventionally, the direction with the maximal divergence is known as a fast axis, and the direction with the minimal divergence is known as a slow axis. The above phenomenon creates problems in some optical devices where homogeneity of a beam in mutually perpendicular directions of its cross section is a critical factor. One such optical device is a laser-diode bar which nowadays finds a very wide application in the fields of material processing, medical instrumentation, etc.

A diode bar is a high-power semiconductor laser (laser diode), containing a one-dimensional array that consists of broad-area emitters. They typically may contain 20 and 50 emitters. Each such emitter may have a width, e.g., of about 100 μm and pitch P of 500 μm.

A commercial laser-diode bar available on the market may have a set of laser resonators with the length of the order of 1 cm and may generate a resulting power of the order of tens of watts or even up to ≈200 W. Some prototypes even reach several hundreds of watts (possibly with a reduced lifetime).

Most diode bars operate in the wavelength region from 780 to 980 nm and are used for pumping neodymium, erbium YAG lasers, and for pumping erbium-doped or ytterbium-doped high-power fiber lasers and amplifiers.

However, a specific pattern of radiation from the laser-diode bars makes it difficult to control the shape of the emitted beam. The problem occurs because of the aforementioned different divergence of the beam in the directions of the slow and fast axes. This divergence leads to interference between individual beams at a short distance from the surface of the emitters, and since the emitters are located at a close distance from each other, there is not enough room for placing beam correction means.

Heretofore many attempts have been made to solve the above problem in laser diode arrays. For example, U.S. Pat. No. 5,268,922 issued in 1993 to J.-C. Fouere and C. Metreaud discloses a simple optical collimating device for a single laser diode in the form of a single aspheric lens assembled integrally with a laser diode. A disadvantage of such a device is that in order to compensate for divergence difference on orthogonal axes of the beam cross section, the aforementioned aspheric lens should have a complicated custom design. Furthermore, the device of U.S. Pat. No. 5,268,922 is not applicable to laser diode arrays because of even higher spatial angular anisotropy and partial overlapping of beams emitted by adjacent diodes in the same plane.

U.S. Pat. No. 5,636,059 issued in 1997 to J. Snyder discloses an assembly of two aspheric, e.g., cylindrical, lenses with mutually perpendicular generatrices of refractive surfaces. Each lens functions for a separate axis, i.e., one lens reshapes the beam on the fast axis, while the other reshapes the beam on the slow axis. A similar system may consist of two reflective surfaces, e.g., mirrors, similarly located with respect to each other. Although such a system differentiates beam reshaping functions along different axes, it has a macroscopic, i.e., extended size and therefore presents a problem for a matrix-type arrangement of light sources, particularly for those with small steps.

U.S. Pat. No. 5,056,881 issued in 1991 to Terry Bowen, et al. describes an assembly of a laser diode with at least one optical holographic element located at the output of the laser diode. This system circularizes the beam, collimates it, and removes chromatic aberration. In order to ensure sufficient power compatibility, the holographic element of such a system should be manufactured from a very durable and energetically efficient material such as quartz, which makes the system as a whole relatively expensive. If, on the other hand, the system employs inexpensive, e.g., plastic, replicas for the holographic element, it would have practical applications limited only to low-power sources. Furthermore, similar to the system of U.S. Pat. No. 5,636,059, the system with holographic elements is inapplicable to matrix-type sources.

U.S. Pat. No. 4,609,258 issued in 1986 to Iwao Adachi, et al. discloses a collimating system for laser diodes which utilizes a prismatic-type collimator. A disadvantage of this system is that it generates chromatic aberrations inherent in any prismatic systems. Despite the fact that the system itself consists of many components, compensation of the aforementioned aberrations requires the use of additional optical components. As a result, the system has increased overall dimensions.

U.S. Pat. No. 5,541,774 issued in 1996 to R. Blankenbecler describes so-called gradient optical elements. These optical elements can replace various cylindrical, conical, and other aspheric elements used for collimating and beam reshaping. Such optical systems are compact, compatible with matrix-type light sources, but are complicated in structure and expensive to manufacture. However, the range of commercially available materials is limited, and therefore gradient optical elements can be manufactured with limitations dictated by wavelengths and output power of the light sources compatible with such optical systems. Another disadvantage of gradient optical elements in light of their application to beam shaping is that they have a limited range of the refractive index variation, which sometimes is insufficient for precise reshaping of the light beam.

U.S. Pat. No. 5,825,551 issued in 1998 to William A. Clarkson discloses a beam shaper utilizing a principle of multiple re-reflection in the system of two parallel reflective surfaces (including the case of total internal reflection). A main disadvantage of such a system is interference of reflected beams which causes spatial modulation of radiation resulting in its inhomogeneity.

Another similar system is described in U.S. Pat. No. 5,808,323 issued in 1998 to Werner Spaeth, et al. This system consists of a cylindrical lens common for a line of photo diodes and two mirrors. The use of a cylindrical lens introduces into the system all disadvantages described above with regard to the systems utilizing aspheric elements. Furthermore, the use of a single cylindrical lens for the entire strip of the diodes does not prevent the adjacent beams from interference and does not allow individual adjustment of beams emitted by individual light sources.

The above disadvantages are partially solved in a fault tolerant optical system described in U.S. Pat. No. 5,369,659 issued in 1994 to Horace Furumoto, et al. The system consists of the following elements arranged in sequence: a laser diode array, two lenslet arrays (collimating and correcting), and an assembly of directing and focusing optics. However, this system comprises a macroscopic workbench which collimates and corrects individual beams as a whole without addressing the aforementioned fast and slow axes individually, i.e., without separate adjustment of beam divergence in the aforementioned directions. Thus, such a system does not compensate for faults resulting from non-uniform divergence of the beam in the directions of slow and fast axes. This system rather differentiates two functions of the beam shaper, i.e., one lens array is used for correcting the optical faults where the second lens array performs fill-factor enhancement. Another disadvantage of the system of U.S. Pat. No. 5,369,659 is that it consists of a plurality of individual lenses produced, e.g., by laser milling. In other words, each array has a composite structure and consists of a plurality of individually manufactured or processed lenses. Moreover, as is stated in the aforementioned U.S. patent, in the manufacturing process with laser milling each individual lens is associated with an individual laser. Thus, the manufacturing process is complicated, expensive, time-consuming, and may involve custom design. In other words, the device of U.S. Pat. No. 5,369,659 cannot be produced in a single manufacturing step such as molding or etching.

U.S. Patent Application Publication No. 20050105189 (inventor: A. Mikhailov) discloses an arrangement for optical beam transformation having at least one light source which can emit at least one light beam with the at least one light beam having a greater divergence in a first direction (Y) than in a second direction (X) at right angles to it. The system further comprises a collimation means, which can at least reduce the divergence of the at least one light beam in the first direction (Y), and an apparatus for optical beam transformation, which is arranged downstream from the collimation means in the propagation direction (Z) of the at least one light beam, with the apparatus being such that the divergence of the at least one light beam passing through the apparatus in the first direction (Y) is interchanged with the divergence in the second direction (X) at right angles to it, and such that the cross-sectional area of the at least one light beam is reduced in the apparatus for optical beam transformation.

U.S. Pat. No. 6,407,870 issued in 2002 to I. Gurevich, et al. discloses an optical system comprising a first array of individual beam shaping elements and a second array of beam shaping elements placed between a light source, e.g., a linear array of individual laser diodes, and a reshaped beam receiver, e.g., an optical fiber cable. The inhomogeneous beams emitted from the laser diodes are passed in sequence through the first and second stages so that the first stage reshapes the cross section of the beam, e.g., in the fast-axis direction, and the second stage reshapes the cross section of the beam, e.g., in the slow-axis direction. As a result, the output beams of the system may have a cross section reshaped to any desired configuration, e.g., suitable for inputting into the optical-fiber cable and having divergences individually adjusted in mutually perpendicular directions.

SUMMARY OF THE INVENTION

The beam shaper of the invention comprises a four-component system that consists of the following components: a fast-axis collimator that comprises a common cylindrical lens with an aspherical profile; an array of spherical (aspherical) telescope units, where each telescope unit consists of two microlenses (hereinafter referred to as individual telescopes) and where each individual telescope is shifted in accordance with a predetermined law to a certain distance (pitch) relative to a neighboring individual telescope in the direction of the fast axis (Z direction); an array of cylindrical lenses shifted relative to each other in accordance with another predetermined law that reshapes the beams into a predetermined spatial pattern; and a system of focusing lenses that focus the beams of the predetermined spatial pattern into a specific shape suitable for inputting the collimated beams, e.g., into an optical fiber.

In other words, a pair of lenses that form each individual telescope unit are shifted relative to the lenses that form a neighboring telescope unit with a certain pitch "h". It is understood that the array contains a plurality of such individual telescope units which are sequentially shifted with pitch "h" relative to the neighboring pairs. Each telescope unit operates only with one individual beam emitted from a respective individual emitter of the laser bar. It is understood that quantity of telescope unit is equal to the quantity of individual emitters in the bar.

The aforementioned individual telescope units are combined into groups, e.g., into three groups, where optical axes of the neighboring units are shifted relative to each other with pitch "h". Thus, if one of the individual telescopic units has an optical axis that coincides with the optical axis of the respective emitter, then other individual telescopic units have optical axes which are shifted relative to the optical axes of their respective emitters.

The telescopic system as whole transforms the linear distribution of the initial beams emitted from the emitters of the laser-diode bar into a two-dimensional pattern where the beams do not interpose on each other.

The discrete pattern formed by a plurality of individual beams is now reshaped into a two-dimensional pattern having a less discrete and more uniform distribution of light intensity and a shape more convenient for subsequent coupling, e.g., for focusing into the end face of an optical fiber of a light transmission system.

DETAILED DESCRIPTION OF THE INVENTION

Figure 1:
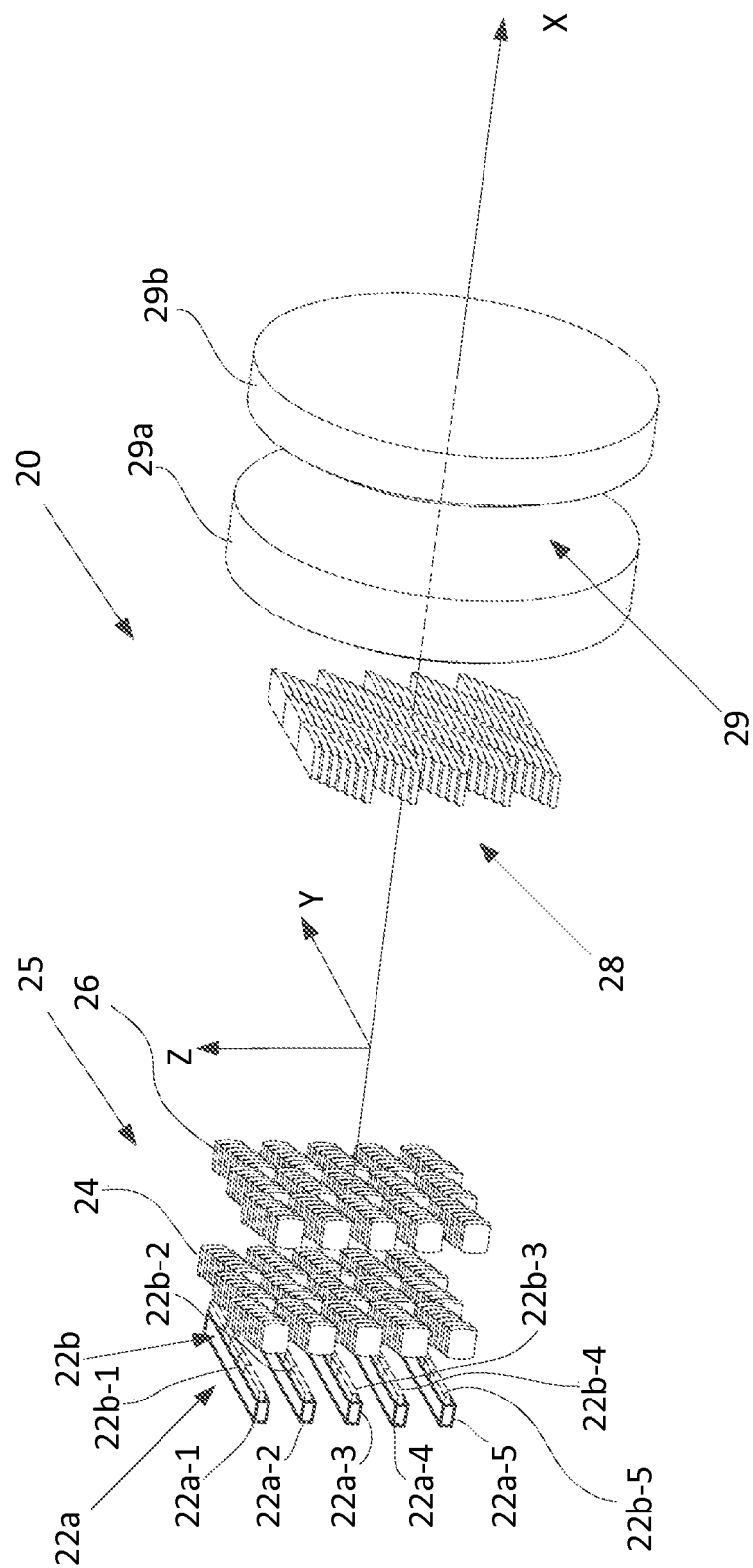
FIG. 1 is a general perspective view of a beam shaper optical system of the invention.
Figure 2:
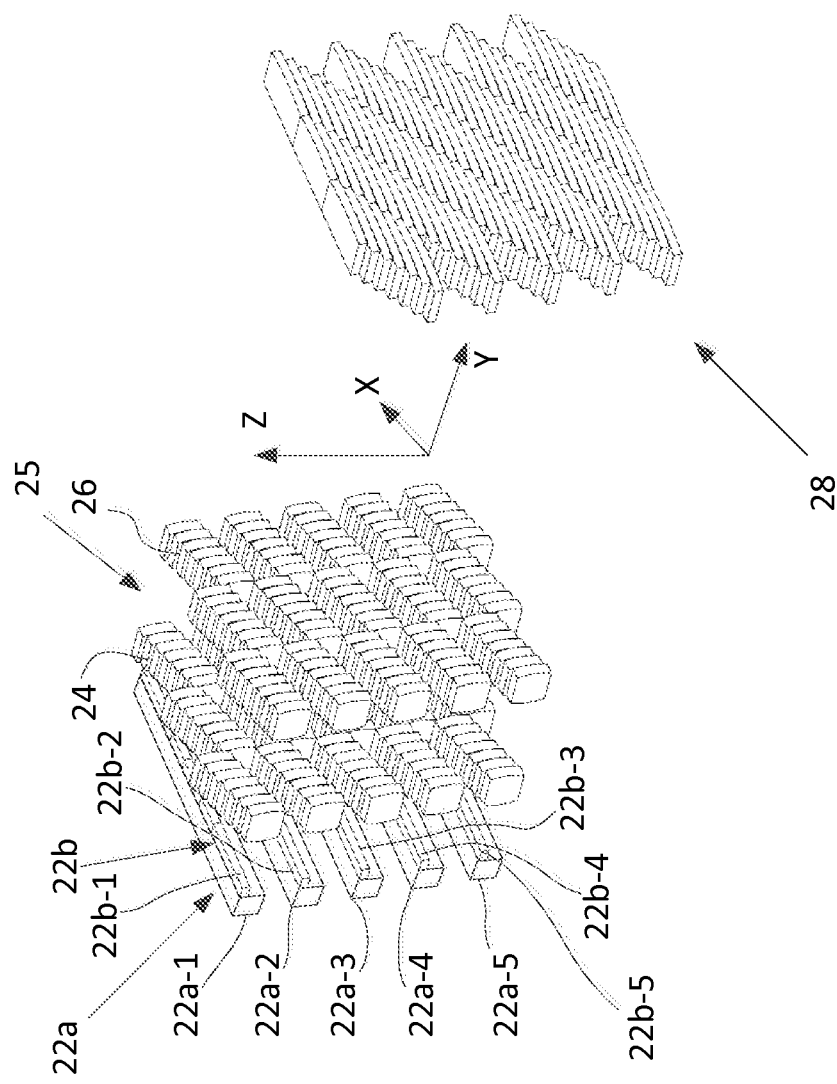
FIG. 2 is a more detailed view of the part of the system of FIG. 1 that is located in front of the array of cylindrical lenses used for reshaping of the two-dimensional uniform-light-intensity into the final shape.

The beam shaper system of the invention for shaping beams emitted from a laser diode array is shown in FIGS. 1 and 2, where FIG. 1 is a general perspective view of a beam shaper optical system of the invention, and FIG. 2 is a more detailed view of the part of the system of FIG. 1 that is located in front of the array of cylindrical lenses used for reshaping beams emitted from a set of laser bars into a two-dimensional pattern having uniform light intensity and suitable for subsequent coupling, e.g., into the end face of an optical fiber.

In general, the beam shaper system of the invention, which as a whole is designated by reference numeral 20, comprises a four-component system that consists of the following components: a set 22a of laser-diode bars 22a-1, 22a-2, . . . 22a-5 located spatially in an orthodox X-Y-Z coordinate system having an X-Y plane, X-Z plane, Y-Z plane; a set 22b of fast-axis collimators 22b-1, 22b-2, . . . 22b-5. Each such collimator cooperates with a respective laser diode. Each collimator is located in close proximity to the emitters (not shown in FIGS. 1 and 2) of the set 22a of laser-diode bars 22a-1, 22a-2, . . . 22a-5; an array 25 of spherical/aspherical telescope units, each consisting of two arrays 24 and 26 of individual telescopic units (only fifteen such individual telescopic units are shown in each array, though the number of the units in the array is not limited by the illustrated example); an array 28 of cylindrical lenses shifted relative to each other in the plane Y-Z in the direction of the Y-axis in accordance with another predetermined law that reshapes the beams into a predetermined spatial pattern; and a focusing unit 29 located in the Y-Z plane and comprising collimation lenses 29a and 29b that reshape and collimate (focus) the beams, i.e., the beams (not shown) which passed through the array of the second cylindrical lenses, into a beam of uniform intensity and predetermined shape suitable for subsequent coupling, e.g., into an optical fiber (not shown). One of the collimation lenses, e.g., the lens 29a may comprise a composite convex-concave lens, and the lens 29b may comprise a bi-convex lens. In fact, the focusing unit 29 may have a different structure and may comprise even a single spherical lens.

Figure 3:
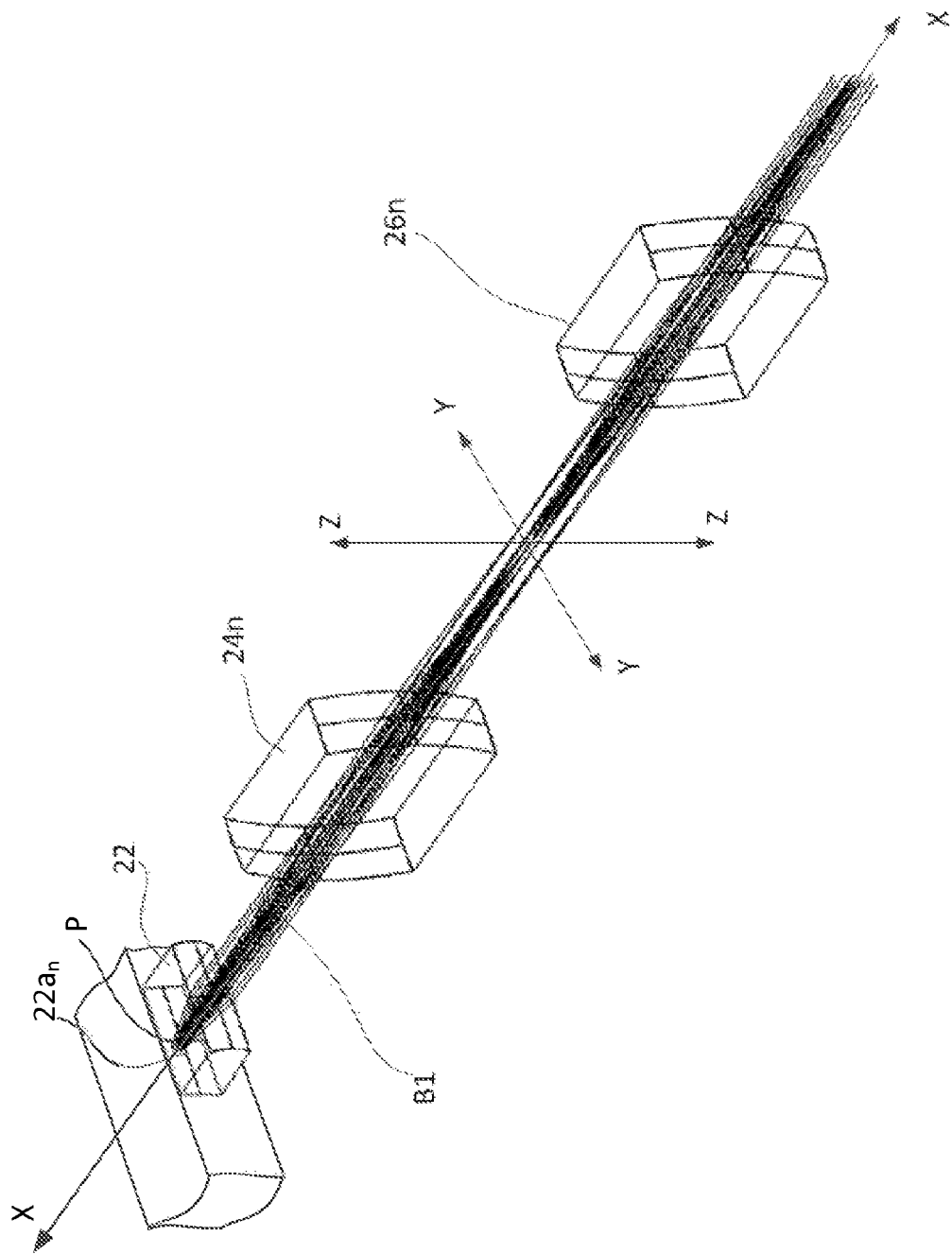
FIG. 3 is a three dimensional view that shows a part of an optical path of the light beam that is emitted from one laser emitter of the system of FIG. 1.

FIG. 3 is a three dimensional view that shows a part of an optical path of the light beam B1 that is emitted from one laser emitter, e.g., a laser emitter $22a_n$ of the laser-diode bar 22a-1 (FIG. 1), and that propagates in the direction of the axis X-X. The emitters such as the emitter $22a_n$ are located linearly in the X-Y plane and are spaced from each other with a predetermined laser-diode emitter pitch.

FIG. 3 also shows one of the fast-axis collimator, i.e., the fast-axis collimator 22b-1, which is located in the X-Y plane and collimates a beam B1 that in point P enters this collimator 22b-1 and passes through a lens 24n and further through a lens 26n. As can be seen from FIG. 3, the lenses 24n and 26n are bi-convex lenses having spherical or aspherical curvatures in planes X-Y and X-Z and provide conversion of the beam B1 with a certain shift in the X-Z plane in manner describe below. Furthermore, the lenses 24n and 26n built the image of the emitter $22a_n$ in the Y-X plane in the focal plane (not shown) of the lens 26n. On the other hand, lenses 24n and 26n operate as a telescope in a Z-X plane, and the beam B1 is shifted in the aforementioned plane.

Figure 4:
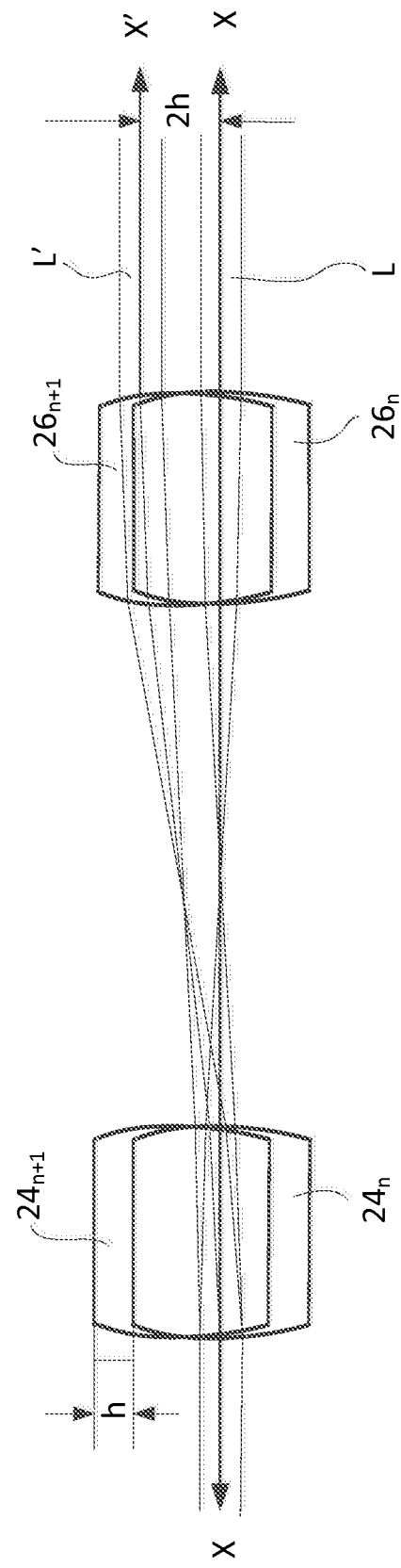
FIG. 4 is a schematic side view of an individual telescope unit that illustrates the shift of two neighboring beams emitted from a pair of neighboring emitters caused by displacement of two neighboring lenses in the X-X plane.

FIG. 4 is a schematic side view of an individual telescope unit that illustrates the shift of two neighboring beams emitted from a pair of neighboring emitters caused by displacement of two neighboring lenses in the Y-Z plane. In other words, as shown in FIG. 4, the lenses $24_{n+1}$ and $26_{n+1}$ are arranged so that each of these lenses is shifted relative to the neighboring lenses $24_n$ and $26_n$ respectively, with a certain pitch "h". Although two pairs of lenses $24_n$-$26_n$ and $24_{n+1}$-$26_{n+1}$ are shown in FIG. 4, the system contains a plurality of such pairs which are sequentially shifted by the pitch "h" with respect to the neighboring pair.

As can be seen from FIG. 4, after passing through the lens $24_{n+1}$ the beam L that was coaxial with the beam L on the axis Y is shifted relative to the beam L to a double-pitch distance "2h". i.e., into the position of the beam L'.

Regarding the divergence of the beams in the direction of the slow axis, i.e., the axis Y, the lenses of each individual telescope collimate the slow-axis beams as well, so that the light beams propagate without intersection with the neighboring beams on the entire optical path till the array 28 (FIGS. 1 and 2) of the cylindrical lenses shifted relative to each other.

Figure 5:
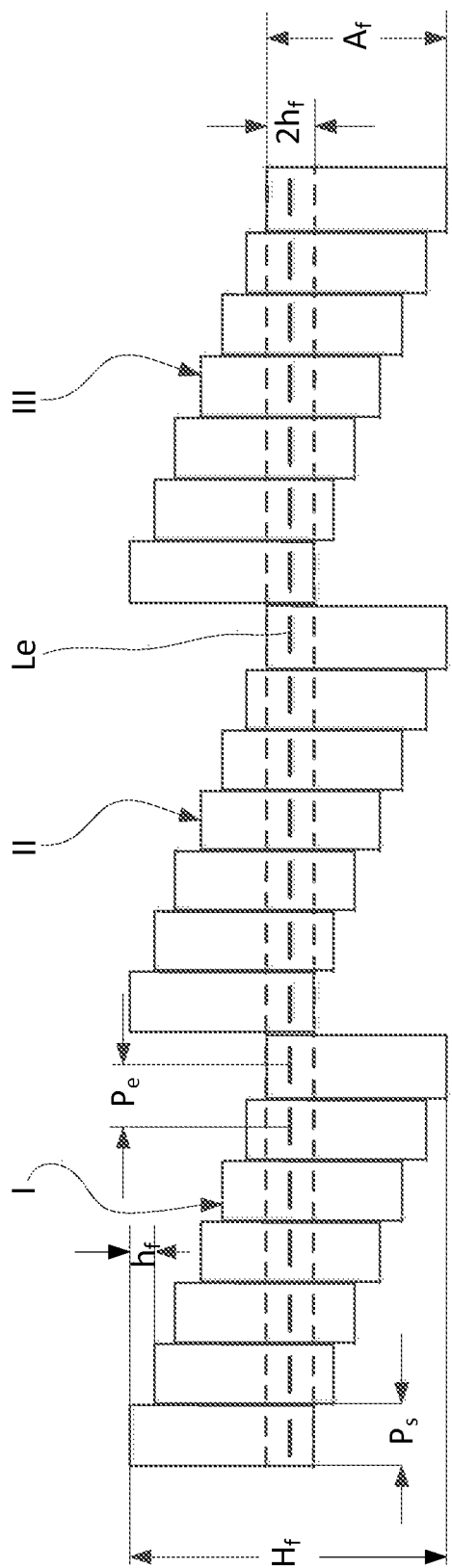
FIG. 5 is a front view of telescopic units arranged into arrays which are combined into groups for controlling beams emitted from a single laser-diode bar.

FIG. 5 is a front view of telescopic units arranged into arrays which are combined into groups. It can be seen from FIG. 5 that each aforementioned pairs of lenses such as a pair consisting of lenses $24_n$ and $26_n$ (FIG. 4) are combined into groups (in the illustrated case, into three groups I, II, and III) and can collimate the beams emitted from a single laser-diode bar. It should be noted that FIG. 5 is a view in the direction of beam propagation toward a viewer, i.e., in the direction perpendicular to the plane of the drawing. Therefore, only one lens of each pair is seen in FIG. 5. Each dot of the dotted line $L_e$ designates an individual emitter, e.g., of the laser-diode bar 22a-1 (FIG. 1). Since in the modification shown in FIG. 5 each group contain seven emitters, the entire telescope system 25 (FIG. 1) consists of one hundred five emitters (five laser-diode bars).

It can be seen that each group contains substantially equal number of the spherical/aspherical telescope units and that the total number of the spherical/aspherical telescope units in all the groups is substantially equal to the number of the emitters.

The optical structure shown in FIGS. 1 to 5 redistribute the beams emitted from the individual emitters of the laser-diode bars 22a-1, 22a-2, . . . 22a-5 (FIG. 1) into a pattern most suitable for final beam reshaping with the use of the array 28 of cylindrical lenses shown in FIG. 1. Each lens unit shown in FIG. 5 has two lenses with curved surfaces on the back and front sides in the viewer direction but the curvatures can be seen in FIG. 3 (lenses $24_n$ and $26_n$). In FIG. 5, $H_f$ is a height of the entire array of the telescopic system composed of three groups; $h_f$ is the shift between the neighboring lenses; $A_f$ is the height of a single lens; $P_s$ is the width of a single lens. It is understood that $P_s$ is equal to $P_e$, where $P_e$ is a pitch of the emitters in the laser-diode bar. It is understood, that the pitch of the set of laser-diode bars in vertical directions along Z axis is $H_f$.

Thus, the gist of the invention consists in that by using the shifted telescopic units arranged in a two-dimensional matrix it is possible to achieve such an arrangement of the emitter images which, makes it possible, without changing a degree of divergence in the fast axis direction, to arrange the collimators of the slow axis in a bricklayer pattern so that these collimators will be able to collimate the light in the slow-axis direction with an n-times greater degree of collimation, where "n" is the number of shifts. Thus, directly after passing through the bricklayer structure, it is possible to obtain a light beam perfectly collimated in the direction of both axes.

As can be seen from FIGS. 1, 2, 4-8, the collimation optics can be conveniently manufactured as compact monolithic blocks.

As far as the unit 29 that consists of the lenses 29a and 29b that focus the propagating beams into the light spot, this unit functions as a focusing objective needed for forming a light spot of a required size in the back focus of this objective, where the size of the back focus is limited by the size of the numerical aperture of the objective, including one that may be needed for coupling of the output beam into the end face of the optical fiber.

An illustrating example of such a system is a laser-diode bar that has an emitter area in the slow axis direction ($L_s$) and an angle of radiation in the same direction ($\Theta_s$) that can be expressed as the following invariant $I_s$ (a distance between the emitters).

In other words, $$I_s = L_s * \sin \Theta_s,$$

where:
Ls—pitch of laser bar.
ds—length of emitter.

$$Is = Ls - ds.$$

Since the emitters are located from each other on a finite distance ($I_s$), the maximal focus distance of the collimator is $F_s = I_s/2 \sin \Theta_s$, and the minimal divergence of radiation after collimation is $\tan \Theta s' = d_s/2F_s$.

Let us consider the case of a laser-diode bar that consists of 19 emitters spaced from each other with a pitch of 500 μm. The length of the emitter in the slow-axis direction is 100 μm. Radiation in the slow-axis direction has a divergence of $\Theta_s = \pm 10°$, $NA_s = 0.174$, where $NA_s$ is an aperture in the slow-axis direction. This means that the maximal focus distance of the slow-axis collimator may be expressed as follows:

$$F_s = I_s/2 \sin \Theta s = 0.4/2*0.174 = 1.15 \text{ mm}$$

and the divergence of the collimated beam in the slow-axis direction is the following:

$$2 \tan \Theta s' = ds/2Fs = \pm 0.0434 = \pm 2.5°.$$

Thus, as mentioned above, the proposed collimation (focusing) system consists of the following components:
1) a fast-axis collimator (aspherical-cylindrical lens);
2) an array of spherical (aspherical) telescope units shifted with respect to each other in the direction of the fast axis in accordance with a predetermined law;
3) an array of cylindrical lenses where the lenses are shifted relative to each other in the plane Y-Z in the direction of the axis Y in accordance with a predetermined law (see FIGS. 6 and 7); and
4) a focusing unit that reshapes the beams and focuses the beams which passed through the array of cylindrical lenses into a shape suitable for coupling, e.g., into the end face of a light-receiving optical fiber. It should be noted that a distance between symmetry planes of the cylindrical lenses in the X-axis direction corresponds to the pitch between the emitters.

The aforementioned another predetermined law is shifting of the second cylindrical lenses relative to each other with a pitch equal to the predetermined laser-diode emitter pitch.

Figure 6:
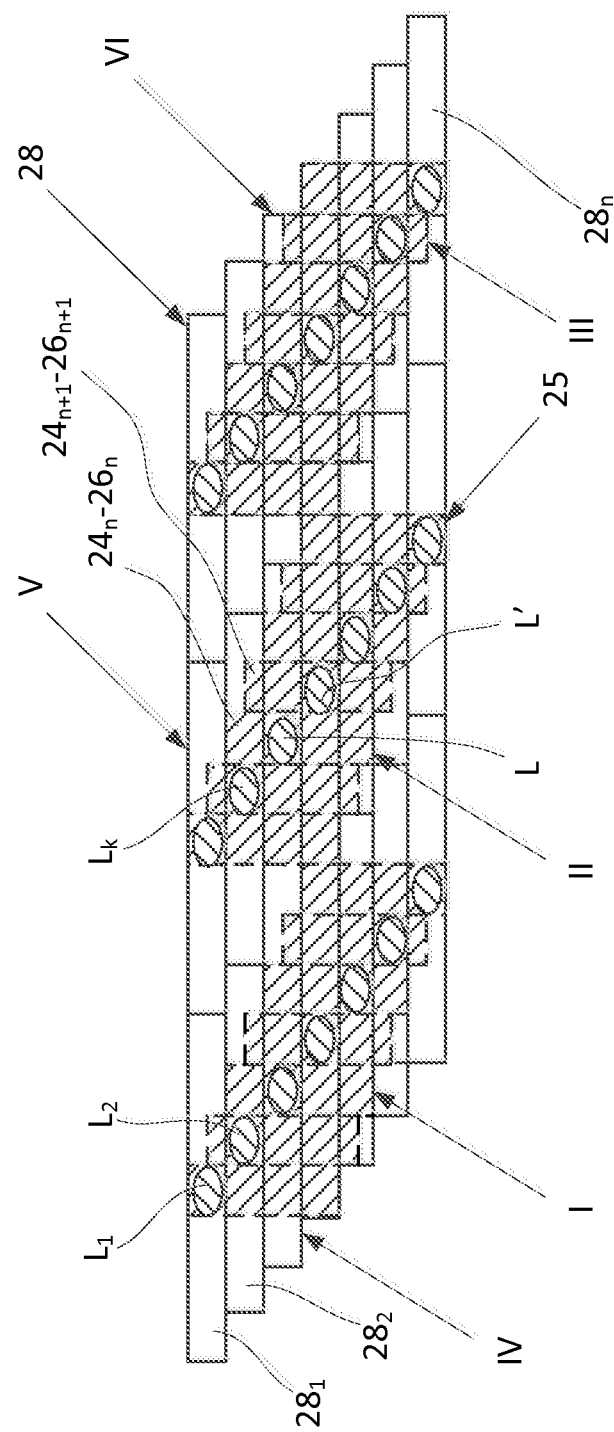
FIG. 6 shows a focusing unit for processing slow-axis beams emitted from a single laser-diode bar, the unit comprising a set of three arrays with seven cylindrical lenses in each.

More specifically, FIG. 6 shows a collimator of the slow axis in the form of a set 28 (FIG. 1) of three arrays IV, V, and VI with seven cylindrical lenses in each. As above, although the system contains a set of laser-diode bars, for the sake of simplicity, operation of the matrix of the telescope units is considered and illustrated for collimation of beams emitted only from one laser-diode bar. It is understood that the invention is not limited by this example and that the number of the shifted lenses in the group, may be arbitrary. Reference numerals $28_1, 28_2, \ldots 28_n$ designate three lenses of the aforementioned set. These three sets are manufactured as a single monolithic piece. In the collimator of the type shown in FIG. 6, each lens is shifted relative to the neighboring one by the same pitch $P_e$ as the emitters of the laser-diode bar 20 shown in FIG. 5. The hatched rectangular figures shown by broken lines in FIG. 6 are Y-Z plane are outlines of the array 25 of spherical (aspherical) telescopes shown in FIGS. 1 and 2.

Since the lenses of the collimator are shifted by the distance $P_x$ in the Y-axis direction, the beams that pass through the collimator will be shifted by the distance of $2P_x$.

Figure 7:
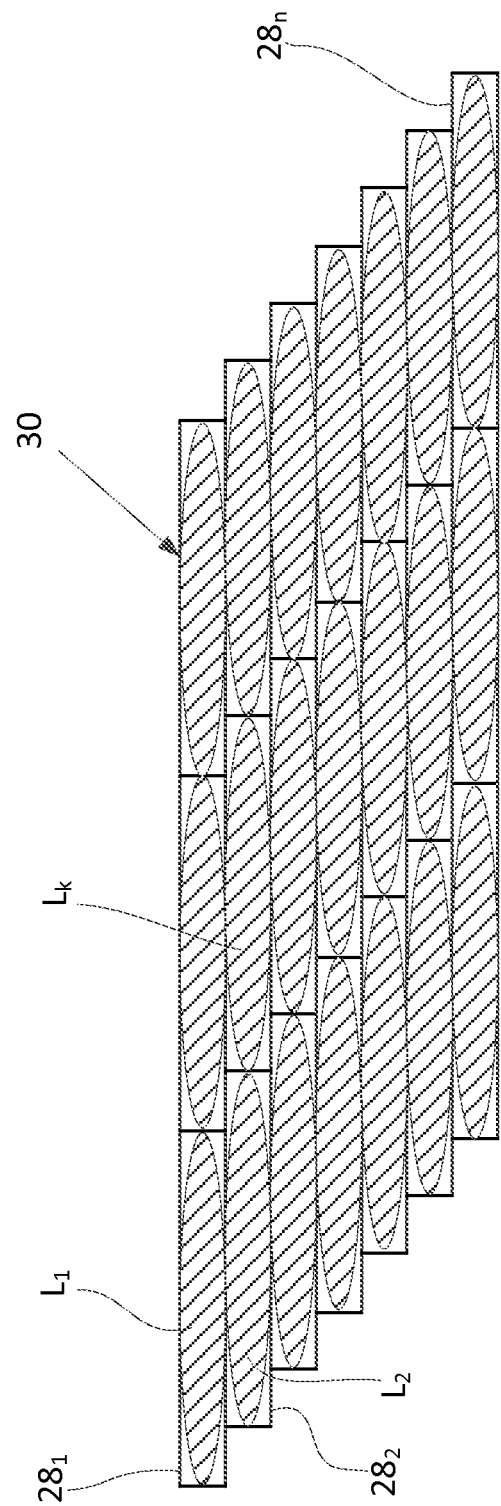
FIG. 7 is a view that shows cross-sections of light beams emitted from a single laser-diode bar at the exit from the array of the cylindrical lenses.

The dark oval spots in FIG. 7 are cross-sections of light beams at the exits from the array of the cylindrical lenses. These beams are similar to those that are shown in FIG. 4 for telescopic units $24_n\text{-}26_n$ (beam L) and $24_{n+1}\text{-}26_{n+1}$ (beam L'). In FIG. 7 the cross-sections of such beams are designated as $L_1, L_2, \ldots L_k$. It can be seen that the aforementioned dark oval spots $L_1, L_2, \ldots L_k$, which correspond to the shape of the summarized beam at the exit the optical system 20 (FIG. 1) of the invention fill practically the entire outline of the monolithic set 28 of the cylindrical lens array.

Thus, actually a new light radiation source 20 (FIG. 1) consisting of a plurality of emitters (such as the emitter $22a_n$) is created, the images of these emitters re-arranged into a brickwork pattern 30 being shown in FIG. 7. In operation, the fast-axis beams of this system are used in a pre-collimated form, while the beams that propagate in the slow-axis direction are diverged and propagate as if issued from the emitters located in shifted planes.

Figure 8:
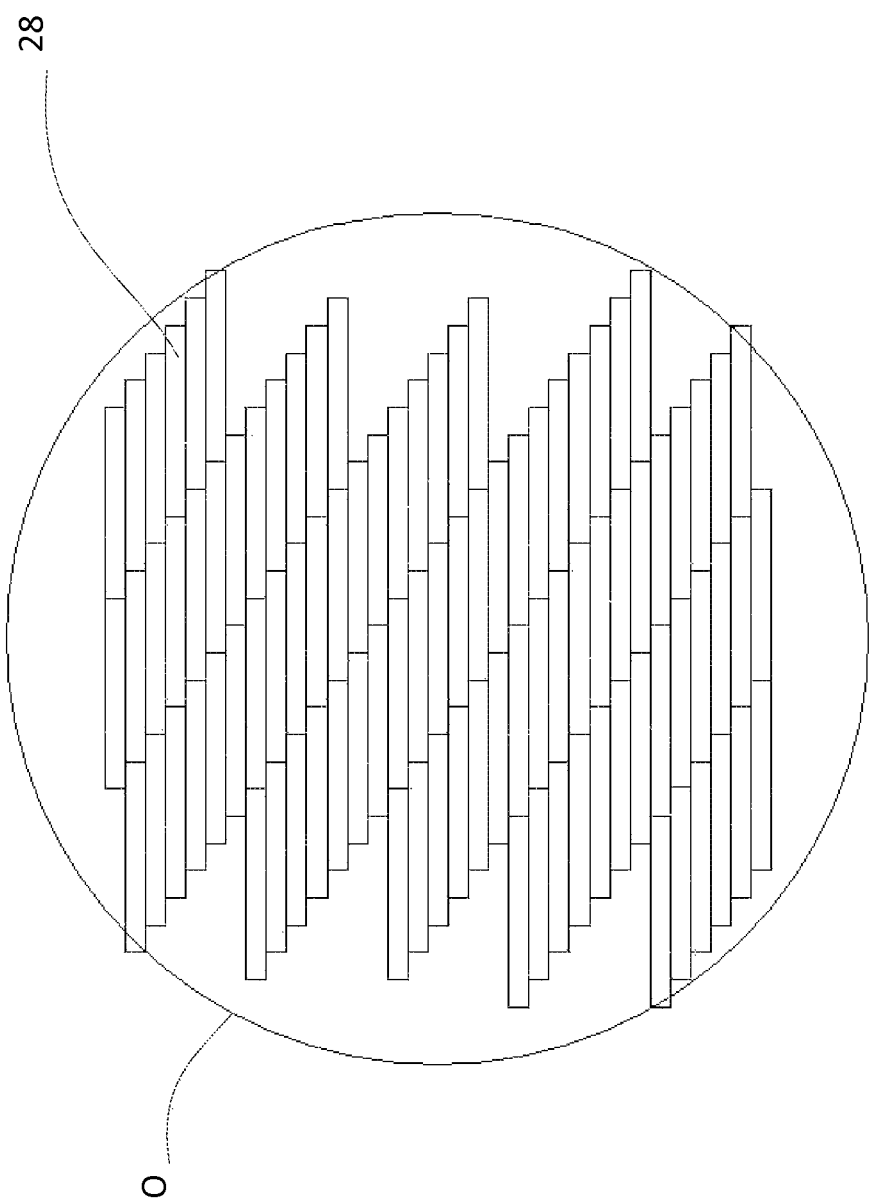
FIG. 8 is a view that shows cross-sections of light beams emitted from a set of five laser-diode bars at the exit from the array of the cylindrical lenses.

FIG. 8 is a view that shows cross-sections of light beams emitted from a set of five laser-diode bars at the exit from the array of the cylindrical lenses. More specifically, FIG. 8 shows a transverse orientation of spatially rearranged beams emitted from the set of laser diodes in the area of the rear surface of the cylindrical lens array 28. It can be seen that the beams are densely packed in the area O.

Although the invention has been shown and described with reference to specific examples, it is understood that these examples should not be construed as limiting the invention and that any changes and modifications can be made with regard to materials, shapes, and other features of the illustrated embodiments without departure from the scope of the patent claims. For example, the number of telescope units in the system may vary in a wide range but should be equal substantially to the number of the emitters. The telescopic units may be combined not necessarily into three groups but to any other group number convenient fort design and application purposes.

The invention claimed is:
1. A beam shaper system for at least one laser-diode bar located spatially in an orthodox X-Y-Z coordinate system having an X-Y plane, X-Z plane, Y-Z plane and comprising:
   a) a fast-axis collimator located in the X-Y plane of the orthodox X-Y-Z coordinate system and comprising a first aspherical-cylindrical lens, the laser diode having emitters which are located linearly in the X-Y plane and are spaced from each other with a predetermined laser-diode emitter pitch;

b) an array of spherical/aspherical telescope units shifted with respect to each other in the direction of the fast axis in accordance with a first predetermined law, each telescopic unit comprising a pair of individual lenses;

c) an array of second cylindrical lenses where the second cylindrical lenses are shifted relative to each other in the plane Y-Z in the direction of the Y axis in accordance with a second predetermined law;

and d) a focusing unit located in the Y-Z plane having means for reshaping and focusing the beams which passed through the array of the second cylindrical lenses.

2. The beam shaper system of claim 1, wherein after passing through the array of second cylindrical lenses cross-sections of the individual beams emitted from the emitter are arranged into brickwork pattern.

3. The beam shaper system of claim 2, wherein the first predetermined law is shifting of the spherical/aspherical telescope units with respect to each other at a predetermined pitch.

4. The beam shaper system of claim 3, wherein the second predetermined law is shifting of the second cylindrical lenses relative to each other with a pitch equal to the predetermined laser-diode emitter pitch.

5. The beam shaper system of claim 4, wherein the spherical/aspherical telescope units are divided into a number of groups with substantially equal number of the spherical/aspherical telescope units in each group and wherein the total number of the spherical/aspherical telescope units in all the groups is substantially equal to the number of the emitters.

6. The beam shaper system of claim 3, wherein means for reshaping and focusing the beams which passed through the array of the second cylindrical lenses comprise at least one lens.

7. The beam shaper system of claim 3, wherein means for reshaping and focusing the beams which passed through the array of the second cylindrical lenses comprise at least a pair of focusing lenses, one of which is a composite convex-concave lens and another is a bi-convex lens.

8. The beam shaper system of claim 2, wherein the spherical/aspherical telescope units are divided into a number of groups with substantially equal number of the spherical/aspherical telescope units in each group and wherein the total number of the spherical/aspherical telescope units in all the groups is substantially equal to the number of the emitters.

9. The beam shaper system of claim 2, wherein means for reshaping and focusing the beams which passed through the array of the second cylindrical lenses comprise at least one lens.

10. The beam shaper system of claim 2, wherein means for reshaping and focusing the beams which passed through the array of the second cylindrical lenses comprise at least a pair of focusing lenses, one of which is a composite convex-concave lens and another is a bi-convex lens.

11. The beam shaper system of claim 1, wherein the first predetermined law is shifting of the spherical/aspherical telescope units with respect to each other at a predetermined pitch.

12. The beam shaper system of claim 11, wherein the second predetermined law is shifting of the second cylindrical lenses relative to each other with a pitch equal to the predetermined laser-diode emitter pitch.

13. The beam shaper system of claim 11, wherein means for reshaping and focusing the beams which passed through the array of the second cylindrical lenses comprise at least one lens.

14. The beam shaper system of claim 11, wherein means for reshaping and focusing the beams which passed through the array of the second cylindrical lenses comprise at least a pair of focusing lenses, one of which is a composite convex-concave lens and another is a bi-convex lens.

15. The beam shaper system of claim 1, wherein the spherical/aspherical telescope units are divided into a number of groups with substantially equal number of the spherical/aspherical telescope units in each group and wherein the total number of the spherical/aspherical telescope units in all the groups is substantially equal to the number of the emitters.

16. The beam shaper system of claim 15, wherein means for reshaping and focusing the beams which passed through the array of the second cylindrical lenses comprise at least one lens.

17. The beam shaper system of claim 15, wherein means for reshaping and focusing the beams which passed through the array of the second cylindrical lenses comprise at least a pair of focusing lenses, one of which is a composite convex-concave lens and another is a bi-convex lens.

18. The beam shaper system of claim 1, wherein means for reshaping and focusing the beams which passed through the array of the second cylindrical lenses comprise at least one lens.

* * * * *